(12) United States Patent
Turtinen et al.

(10) Patent No.: US 10,701,588 B2
(45) Date of Patent: Jun. 30, 2020

(54) METHODS, APPARATUSES AND COMPUTER PROGRAM PRODUCT FOR PDU FORMATTING ACCORDING TO SDU SEGMENTATION

(71) Applicant: NOKIA SOLUTIONS AND NETWORKS OY, Espoo (FI)

(72) Inventors: Samuli Heikki Turtinen, Ii (FI); Timo Koskela, Oulu (FI)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 16/065,084

(22) PCT Filed: Dec. 23, 2015

(86) PCT No.: PCT/EP2015/081134
§ 371 (c)(1),
(2) Date: Jun. 21, 2018

(87) PCT Pub. No.: WO2017/108123
PCT Pub. Date: Jun. 29, 2017

(65) Prior Publication Data
US 2018/0376372 A1    Dec. 27, 2018

(51) Int. Cl.
*H04W 28/06* (2009.01)
*H04L 29/06* (2006.01)
(Continued)

(52) U.S. Cl.
CPC ......... *H04W 28/065* (2013.01); *H04L 1/0079* (2013.01); *H04L 1/0083* (2013.01);
(Continued)

(58) Field of Classification Search
CPC ... H04W 28/065; H04W 24/04; H04W 28/06; H04W 49/90; H04W 80/02; H04L 47/36;
(Continued)

(56) References Cited

U.S. PATENT DOCUMENTS

| 7,295,573 B2* | 11/2007 | Yi | H04L 47/10 370/469 |
| 7,668,198 B2* | 2/2010 | Yi | H04L 47/10 370/466 |

(Continued)

FOREIGN PATENT DOCUMENTS

| EP | 1720322 A1 | 11/2006 |
| EP | 1850522 A2 | 10/2007 |

(Continued)

OTHER PUBLICATIONS

International Search Report and Written Opinion for International Application No. PCT/EP2015/081134, dated Sep. 15, 2016 (11 pages).

(Continued)

*Primary Examiner* — Brian T O'Connor
(74) *Attorney, Agent, or Firm* — Brake Hughes Bellermann LLP

(57) ABSTRACT

An example method includes determining, for a protocol data unit (PDU) to be provided to a receiver entity, whether a segment of a service data unit (SDU) is to be included in the PDU and, if so, determining a position of the segment relative to the SDU. The PDU comprises a header part and a data field part. The method includes determining whether to include information in the header part in dependence on the determining whether the segment of the SDU is to be included in the PDU, and, if so, determining the content of the information in the header part in dependence on the position of the segment relative to the SDU. The method also includes providing the PDU to a receiver entity.

22 Claims, 14 Drawing Sheets

(51) Int. Cl.
*H04L 1/00* (2006.01)
*H04L 12/801* (2013.01)
*H04L 12/805* (2013.01)
*H04W 24/04* (2009.01)

(52) U.S. Cl.
CPC .............. *H04L 47/34* (2013.01); *H04L 47/36* (2013.01); *H04L 69/22* (2013.01); *H04W 24/04* (2013.01)

(58) Field of Classification Search
CPC ..... H04L 47/34; H04L 1/0079; H04L 1/0083; H04L 69/22
See application file for complete search history.

(56) References Cited

U.S. PATENT DOCUMENTS

| | | | |
|---|---|---|---|
| 7,961,657 B2* | 6/2011 | Cave | H04L 1/1835 370/310 |
| 9,210,610 B2* | 12/2015 | Jiang | H04W 28/06 |
| 9,743,319 B2* | 8/2017 | Wu | H04W 36/0027 |
| 10,205,564 B2* | 2/2019 | Cave | H04L 1/1835 |
| 2008/0101408 A1 | 5/2008 | Jiang | |
| 2010/0232356 A1 | 9/2010 | Maheshwari et al. | |
| 2013/0195087 A1* | 8/2013 | Jamadagni | H04W 48/08 370/336 |
| 2014/0105227 A1* | 4/2014 | Maheshwari | H04W 28/06 370/474 |
| 2015/0163695 A1* | 6/2015 | Li | H04W 12/06 370/328 |
| 2015/0373581 A1* | 12/2015 | Marinier | H04L 49/90 370/229 |
| 2016/0135095 A1* | 5/2016 | Wu | H04W 36/0027 370/328 |
| 2016/0183124 A1* | 6/2016 | Marinier | H04L 49/90 370/229 |
| 2017/0041766 A1* | 2/2017 | Vajapeyam | H04W 80/02 |
| 2017/0142770 A1* | 5/2017 | Fu | H04L 1/1614 |
| 2017/0317784 A1* | 11/2017 | Kasher | H04L 1/0005 |
| 2018/0255478 A1* | 9/2018 | Yu | H04W 28/06 |
| 2019/0074936 A1* | 3/2019 | Lee | H04L 1/18 |

FOREIGN PATENT DOCUMENTS

| | | |
|---|---|---|
| EP | 2098031 A2 | 9/2009 |
| JP | 2008538480 A | 10/2008 |
| JP | 2010035236 A | 2/2010 |
| JP | 2010512714 A | 4/2010 |
| KR | 20060115289 A | 11/2006 |
| KR | 20090101223 A | 9/2009 |

OTHER PUBLICATIONS

3GPP TSG-RAN WG2 Meeting #55, R2-062876, "Issues with RLC/MAC header structure" Seoul, South Korea, Oct. 9-13, 2006 (3 pages).
3GPP TS 36.322 V12.2.0, "3rd Generation Partnership Project; Technical Specification Group Radio Access Network; Evolved Universal Terrestrial Radio Access (E-UTRA); Radio Link Control (RLC) protocol specification (Release 12)" Sophia Antipolis, France Mar. 2015 (40 pages).
3GPP TSG RAN WG2 Meeting #56bis, R2-070106, "RLC PDU Structure in LTE", Sorrento, Italy, Jan. 12, 2007 (5 pages).
Examiner Report for European Application No. 15816806.2, dated Jul. 15, 2019, 5 pages.
Office Action for Japanese Application No. 2018-533207, dated Apr. 15, 2019, 5 pages.
Huawei, HiSilicon; 3GPP TSG-RAN WG2 Meeting #91; R2-153364; "Extension of SN and SO field in RLC PDU"; Beijing, China, Aug. 24-28, 2015; 20 pages.
Office Action for Korean Application No. 10-2018-7020840, dated Dec. 11, 2019, 9 pages.

* cited by examiner

METHODS, APPARATUSES AND COMPUTER PROGRAM PRODUCT FOR PDU FORMATTING ACCORDING TO SDU SEGMENTATION

CROSS-REFERENCE TO RELATED APPLICATIONS

This application is a national stage entry of PCT Application No. PCT/EP2015/081134 filed Dec. 23, 2015, entitled "METHODS, APPARATUSES AND COMPUTER PROGRAM PRODUCT FOR PDU FORMATTING ACCORDING TO SDU SEGMENTATION" which is hereby incorporated by reference in its entirety.

FIELD

The present application relates to a method, apparatus, system and computer program and in particular but not exclusively to segment handling in 5G RLC layer.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. Certain releases of 3GPP LTE (e.g., LTE Rel-11, LTE Rel-12, LTE Rel-13) are targeted towards LTE-Advanced (LTE-A). LTE-A is directed towards extending and optimising the 3GPP LTE radio access technologies. Another example of a communications network is a 5G communication network.

SUMMARY

In a first aspect, there is provided a method comprising determining, for a service data unit to be included in a protocol data unit, whether a segment of the service data unit is to be included in the protocol data unit and, if so, determining the position of the segment relative to the service data unit, the protocol data unit comprising a header part and a data field part, determining whether to include information in the header part in dependence of the first determining, and if so, determining the content of the information in dependence on the first determining and providing the protocol data unit to a receiver entity.

The method may comprise determining that a segment of the service data unit is the first segment of the service data unit and that the content of the information indicates the service data unit length.

The method may comprise determining that a segment of the service data unit is a segment between the first segment and the last segment of the service data unit and that the content of the information indicates segment offset.

The method may comprise determining that a segment of the service data unit is the last segment of the service data unit and that the content of the information indicates the service data unit segment length.

The method may comprise determining that a segment of the service data unit is the last segment of the service data unit and fills the protocol data unit, and determining not to include the information in the header part.

The information may comprise a length indicator field.

The header part may comprise framing information, the framing information comprising a first bit indicative of whether the first byte of the data field corresponds to the first byte of a service data unit and a second bit indicative of whether the last byte of the data field corresponds to the last byte of a service data unit.

The header part may comprise data field element information, the data field element indicative of the number of data field elements in the data field. The method may comprise providing data field element information after the second bit of the framing information and before the first bit of the framing information.

The receiver entity may be a radio link control entity.

The header part may comprise a sequence number and the sequence number corresponds to the sequence number of the first service data unit included in the protocol data unit.

In a second aspect there is provided a method comprising receiving a protocol data unit from a transmission entity, the protocol data unit comprising a header part and a data field part, determining whether a segment of a service data unit is present in the protocol data unit and, if so, determining the position of the segment relative to the service data unit, determining whether information is present in the header part and, if so, using said information in dependence on the first determining.

The method may comprise determining that a segment of the service data unit is the first segment of the service data unit and the content of the information may indicate the service data unit length.

The method may comprise determining that a segment of the service data unit is a segment between the first segment and the last segment of the service data unit and the content of the information may indicate segment offset.

The method may comprise determining that a segment of the service data unit is the last segment of the service data unit and the content of the information may indicate the service data unit segment length.

The first information may comprise a length indicator field.

The header part may comprise framing information, the framing information comprising a first bit indicative of whether the first byte of the data field corresponds to the first byte of a service data unit and a second bit indicative of whether the last byte of the data field corresponds to the last byte of a service data unit.

The header part may comprise data field element information, the data field element indicative of the number of data field elements in the data field. The method may comprise determining the position of the segment relative to the service data unit in dependence on the second bit of the framing information and the data field element information.

The transmission entity may be a radio link control entity.

The header part may comprise a sequence number, wherein the sequence number corresponds to the sequence number of the first service data unit included in the protocol data unit.

In a third aspect, there is provided an apparatus, said apparatus comprising means for determining, for a service data unit to be included in a protocol data unit, whether a segment of the service data unit is to be included in the protocol data unit and means for, if so, determining the position of the segment relative to the service data unit, the protocol data unit comprising a header part and a data field part, means for determining whether to include information in the header part in dependence of the first determining, and means for, if so, determining the content of the information in dependence on the first determining and means for providing the protocol data unit to a receiver entity.

The apparatus may comprise means for determining that a segment of the service data unit is the first segment of the service data unit and that the content of the information indicates the service data unit length.

The apparatus may comprise means for determining that a segment of the service data unit is a segment between the first segment and the last segment of the service data unit and that the content of the information indicates segment offset.

The apparatus may comprise means for determining that a segment of the service data unit is the last segment of the service data unit and that the content of the information indicates the service data unit segment length.

The apparatus may comprise means for determining that a segment of the service data unit is the last segment of the service data unit and fills the protocol data unit, and determining not to include the information in the header part.

The information may comprise a length indicator field.

The header part may comprise framing information, the framing information comprising a first bit indicative of whether the first byte of the data field corresponds to the first byte of a service data unit and a second bit indicative of whether the last byte of the data field corresponds to the last byte of a service data unit.

The header part may comprise data field element information, the data field element indicative of the number of data field elements in the data field. The apparatus may comprise means for providing data field element information after the second bit of the framing information and before the first bit of the framing information.

The receiver entity may be a radio link control entity.

The header part may comprise a sequence number and the sequence number corresponds to the sequence number of the first service data unit included in the protocol data unit.

In a fourth aspect, there is provided an apparatus, said apparatus comprising means for receiving a protocol data unit from a transmission entity, the protocol data unit comprising a header part and a data field part, means for determining whether a segment of a service data unit is present in the protocol data unit and means for, if so, determining the position of the segment relative to the service data unit, means for determining whether information is present in the header part and means for, if so, using said information in dependence on the first determining.

The apparatus may comprise means for determining that a segment of the service data unit is the first segment of the service data unit and the content of the information may indicate the service data unit length.

The apparatus may comprise means for determining that a segment of the service data unit is a segment between the first segment and the last segment of the service data unit and the content of the information may indicate segment offset.

The apparatus may comprise means for determining that a segment of the service data unit is the last segment of the service data unit and the content of the information may indicate the service data unit segment length.

The first information may comprise a length indicator field.

The header part may comprise framing information, the framing information comprising a first bit indicative of whether the first byte of the data field corresponds to the first byte of a service data unit and a second bit indicative of whether the last byte of the data field corresponds to the last byte of a service data unit.

The header part may comprise data field element information, the data field element indicative of the number of data field elements in the data field. The apparatus may comprise means for determining the position of the segment relative to the service data unit in dependence on the second bit of the framing information and the data field element information.

The transmission entity may be a radio link control entity.

The header part may comprise a sequence number, wherein the sequence number corresponds to the sequence number of the first service data unit included in the protocol data unit.

In a fifth aspect, there is provided an apparatus comprising at least one processor and at least one memory including a computer program code, the at least one memory and the computer program code configured to, with the at least one processor, cause the apparatus at least to determine, for a service data unit to be included in a protocol data unit, whether a segment of the service data unit is to be included in the protocol data unit and, if so, determine the position of the segment relative to the service data unit, the protocol data unit comprising a header part and a data field part, determine whether to include information in the header part in dependence of the first determining, and, if so, determine the content of the information in dependence on the first determining and provide the protocol data unit to a receiver entity.

The apparatus may be configured to determine that a segment of the service data unit is the first segment of the service data unit and that the content of the information indicates the service data unit length.

The apparatus may be configured to determine that a segment of the service data unit is a segment between the first segment and the last segment of the service data unit and that the content of the information indicates segment offset.

The apparatus may be configured to determine that a segment of the service data unit is the last segment of the service data unit and that the content of the information indicates the service data unit segment length.

The apparatus may be configured to determine that a segment of the service data unit is the last segment of the service data unit and fills the protocol data unit, and determine not to include the information in the header part.

The information may comprise a length indicator field.

The header part may comprise framing information, the framing information comprising a first bit indicative of whether the first byte of the data field corresponds to the first byte of a service data unit and a second bit indicative of whether the last byte of the data field corresponds to the last byte of a service data unit.

The header part may comprise data field element information, the data field element indicative of the number of data field elements in the data field. The apparatus may be configured to provide data field element information after the second bit of the framing information and before the first bit of the framing information.

The receiver entity may be a radio link control entity.

The header part may comprise a sequence number and the sequence number corresponds to the sequence number of the first service data unit included in the protocol data unit.

In a sixth aspect, there is provided an apparatus comprising at least one processor and at least one memory including a computer program code, the at least one memory and the computer program code configured to, with the at least one processor, cause the apparatus at least to receive a protocol data unit from a transmission entity, the protocol data unit comprising a header part and a data field part, determine whether a segment of a service data unit is present in the protocol data unit and, if so, determine the position of the segment relative to the service data unit, determine whether information is present in the header part and, if so, use said information in dependence on the first determining.

The apparatus may be configured to determine that a segment of the service data unit is the first segment of the service data unit and the content of the information may indicate the service data unit length.

The apparatus may be configured to determine that a segment of the service data unit is a segment between the first segment and the last segment of the service data unit and the content of the information may indicate segment offset.

The apparatus may be configured to determine that a segment of the service data unit is the last segment of the service data unit and the content of the information may indicate the service data unit segment length.

The first information may comprise a length indicator field.

The header part may comprise framing information, the framing information comprising a first bit indicative of whether the first byte of the data field corresponds to the first byte of a service data unit and a second bit indicative of whether the last byte of the data field corresponds to the last byte of a service data unit.

The header part may comprise data field element information, the data field element indicative of the number of data field elements in the data field. The apparatus may be configured to determine the position of the segment relative to the service data unit in dependence on the second bit of the framing information and the data field element information.

The transmission entity may be a radio link control entity.

The header part may comprise a sequence number, wherein the sequence number corresponds to the sequence number of the first service data unit included in the protocol data unit.

In a seventh aspect there is provided a computer program embodied on a non-transitory computer-readable storage medium, the computer program comprising program code for controlling a process to execute a process, the process comprising determining, for a service data unit to be included in a protocol data unit, whether a segment of the service data unit is to be included in the protocol data unit and, if so, determining the position of the segment relative to the service data unit, the protocol data unit comprising a header part and a data field part, determining whether to include information in the header part in dependence of the first determining, and if so, determining the content of the information in dependence on the first determining and providing the protocol data unit to a receiver entity.

The process may comprise determining that a segment of the service data unit is the first segment of the service data unit and that the content of the information indicates the service data unit length.

The process may comprise determining that a segment of the service data unit is a segment between the first segment and the last segment of the service data unit and that the content of the information indicates segment offset.

The process may comprise determining that a segment of the service data unit is the last segment of the service data unit and that the content of the information indicates the service data unit segment length.

The process may comprise determining that a segment of the service data unit is the last segment of the service data unit and fills the protocol data unit, and determining not to include the information in the header part.

The information may comprise a length indicator field.

The header part may comprise framing information, the framing information comprising a first bit indicative of whether the first byte of the data field corresponds to the first byte of a service data unit and a second bit indicative of whether the last byte of the data field corresponds to the last byte of a service data unit.

The header part may comprise data field element information, the data field element indicative of the number of data field elements in the data field. The process may comprise providing data field element information after the second bit of the framing information and before the first bit of the framing information.

The receiver entity may be a radio link control entity.

The header part may comprise a sequence number and the sequence number corresponds to the sequence number of the first service data unit included in the protocol data unit.

In an eighth aspect there is provided a computer program embodied on a non-transitory computer-readable storage medium, the computer program comprising program code for controlling a process to execute a process, the process comprising receiving a protocol data unit from a transmission entity, the protocol data unit comprising a header part and a data field part, determining whether a segment of a service data unit is present in the protocol data unit and, if so, determining the position of the segment relative to the service data unit, determining whether information is present in the header part and, if so, using said information in dependence on the first determining.

The process may comprise determining that a segment of the service data unit is the first segment of the service data unit and the content of the information may indicate the service data unit length.

The process may comprise determining that a segment of the service data unit is a segment between the first segment and the last segment of the service data unit and the content of the information may indicate segment offset.

The process may comprise determining that a segment of the service data unit is the last segment of the service data unit and the content of the information may indicate the service data unit segment length.

The first information may comprise a length indicator field.

The header part may comprise framing information, the framing information comprising a first bit indicative of whether the first byte of the data field corresponds to the first byte of a service data unit and a second bit indicative of whether the last byte of the data field corresponds to the last byte of a service data unit.

The header part may comprise data field element information, the data field element indicative of the number of data field elements in the data field. The process may comprise determining the position of the segment relative to the service data unit in dependence on the second bit of the framing information and the data field element information.

The transmission entity may be a radio link control entity.

The header part may comprise a sequence number, wherein the sequence number corresponds to the sequence number of the first service data unit included in the protocol data unit.

In a ninth aspect there is provided a computer program product for a computer, comprising software code portions for performing the steps the method of the first aspect when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
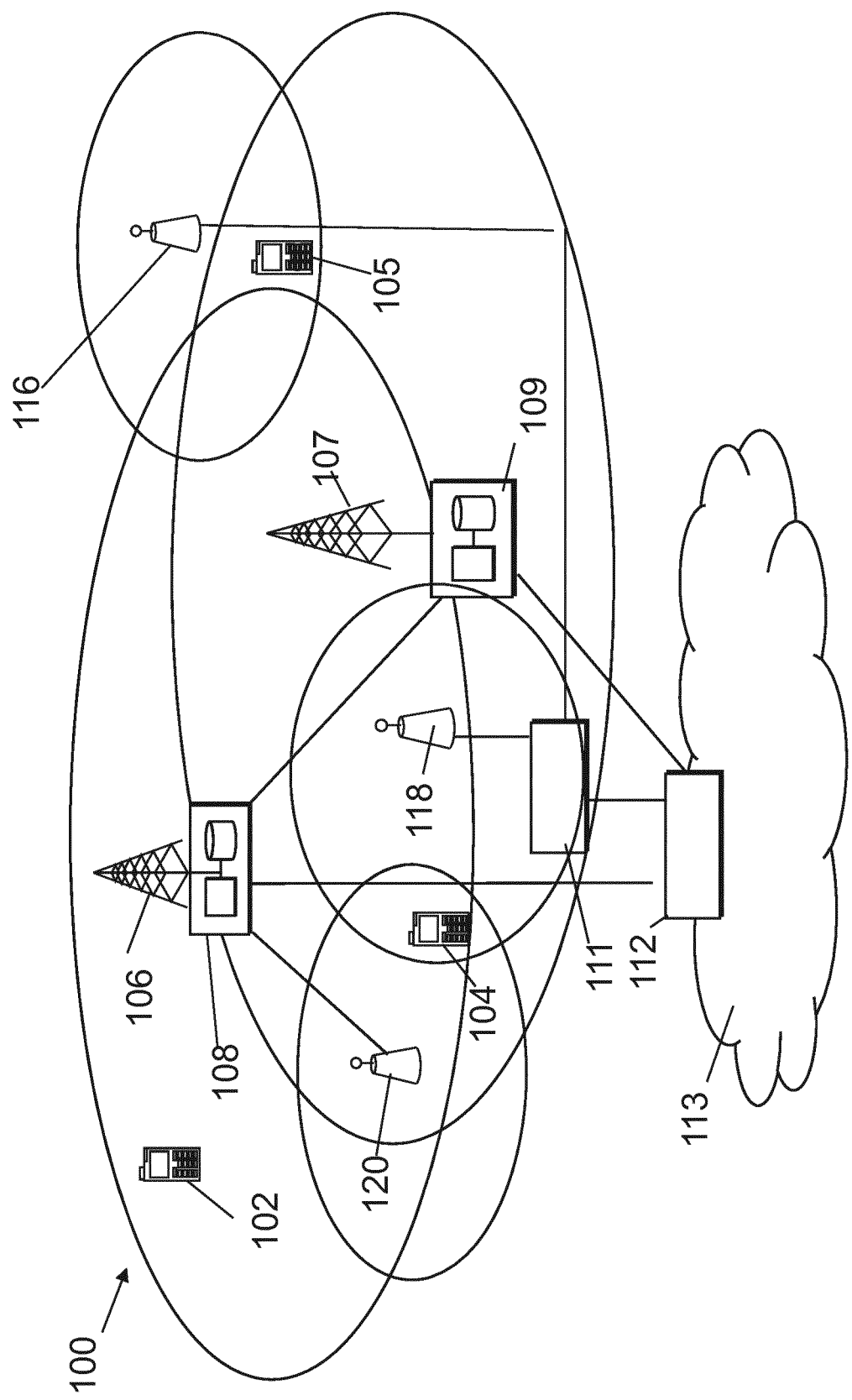
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus.

The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW may be separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
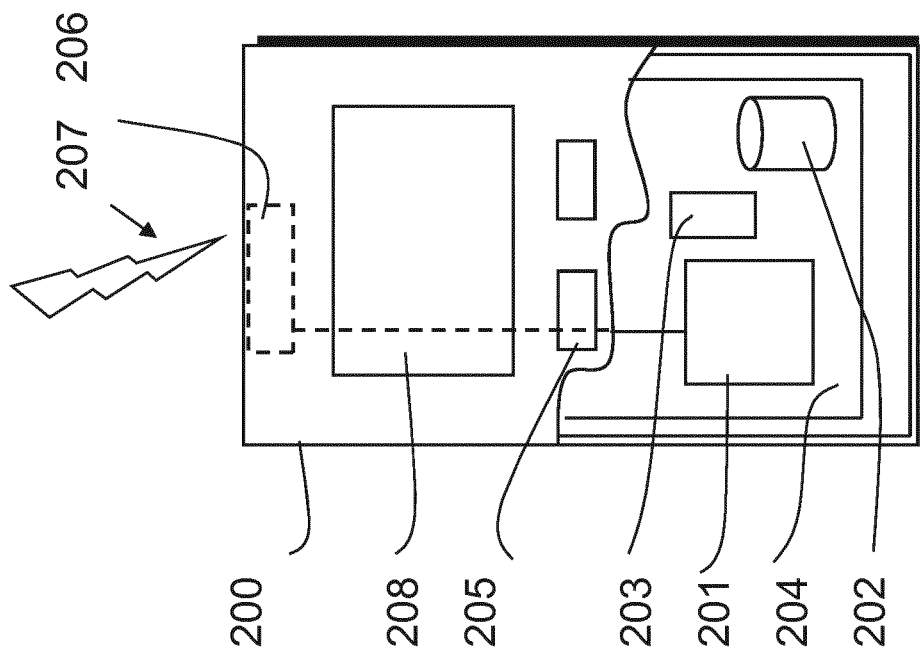
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Another example of a suitable communications system is the 5G concept. Network architecture in 5G may be quite similar to that of the LTE-advanced. Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. 5G may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

During 5G development and requirement setting, increased wireless communication throughputs of up to 10

Gbps are envisaged. Internet traffic, and potentially the used packet sizes to carry the traffic, may increase. However, the maximum used packet sizes may comprise 1500B (normal Ethernet MTU) as well as <100B (IPv4/IPv6 packets carrying TCP ACKs) packets. When considering higher data rates combined with normal packet sizes, it can be seen that it may take a larger number of packets to fill the air interface to reach such a data rate.

As an example, considering 1 Gbps throughput for a 5G user and a smallest resource allocation unit in time domain of 0.2 ms (TTI in PHY layer), there would be 1 Gbps*0.2 ms=200 kb of data in each TTI (the amount of data may vary from TTI to another but 200 kb would be the mean value). Considering the normal internet traffic packet sizes of 1500B and 100B, approximately 17 or 250 of these packets, respectively, would be required to fill one TTI with sufficient data to achieve a 1 Gbps data rate.

Another consideration for 5G systems is that the network (NW) and UE devices' energy efficiency should increase such that 5G devices consume no more, or less, energy than current LTE NW/UE devices. Processing optimization in the communications stack may achieve the expected data rates with less energy consumed per bit.

One proposal to improve energy efficiency while handling bigger data rates is parallel processing in the entities communicating with each other. For example, different parts of a packet may be processed in parallel by different processors in the communication entities. Parallel processing may be completed more rapidly when compared to sequential processing. Parallel processing may consume less energy per bit since the processing speed requirement is less when processing can be done in parallel for multiple components. Another proposal is to enable as much predictability as possible of, e.g., the data to be received, such that the receiver operation can be fully optimized to enable the most efficient processing.

Figure 3:
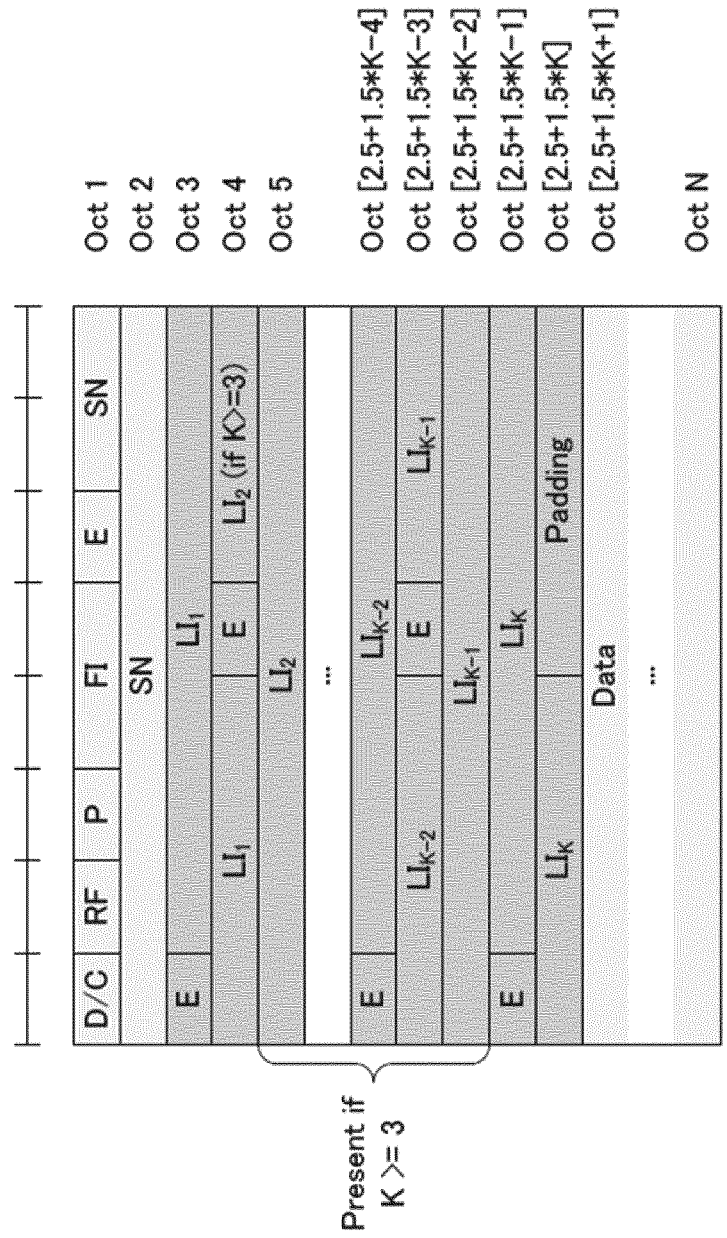
FIG. 3 shows a schematic diagram of LTE RLC AMD PDU structure with multiple (odd number) of SDUs.
Figure 4:
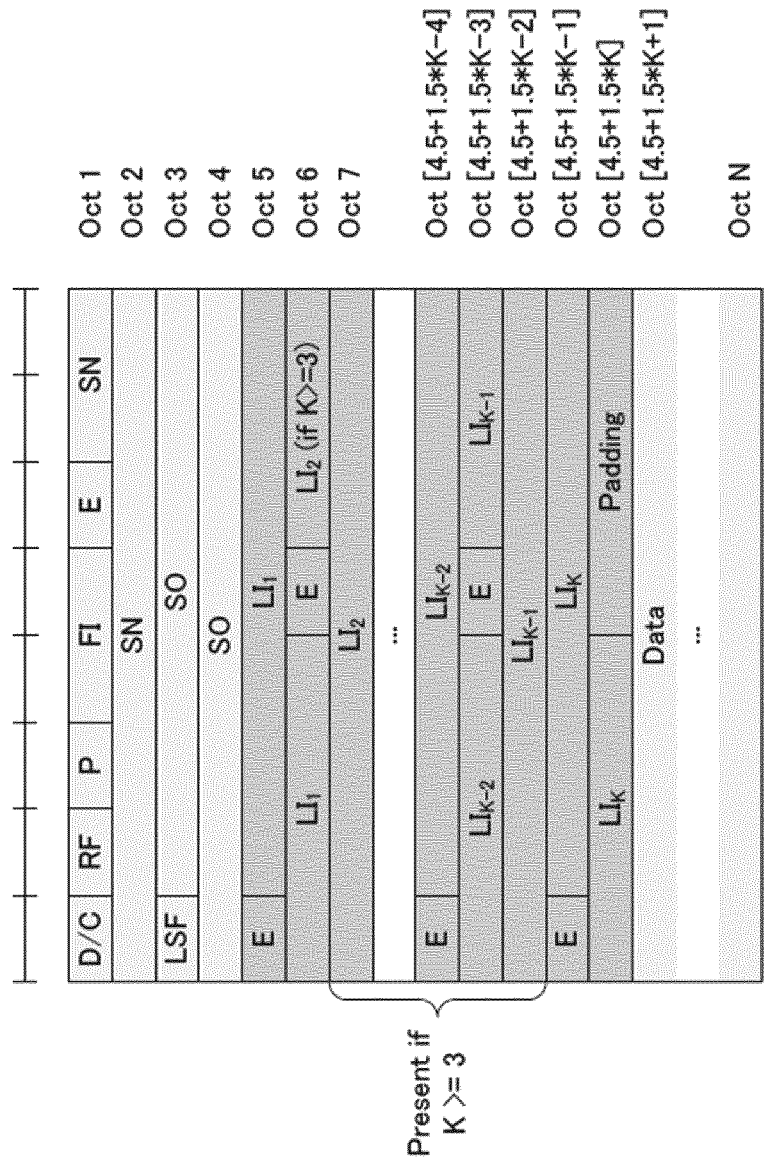
FIG. 4 shows a schematic diagram of LTE RLC AMD PDU segment structure with multiple SDUs inside.

A protocol data unit (PDU) may comprise a header part and a data part. In current LTE systems, the radio link control (RLC) PDU structure is such that the receiver (Rx) RLC entity sequentially processes the whole header before it knows where the data part begins in the PDU. FIGS. 3 and 4 show an example of an LTE RLC acknowledgment mode (AMD) PDU structure with multiple (odd number) of SDUs inside and an example of an LTE RLC AMD PDU segment structure with multiple SDUs inside, respectively.

As an example for the AMD RLC entity, the receiver reads the fixed part of the header until E (extension bit) field, which specifies if the header continues with an extension part (PDU including multiple SDUs) including E & LI (Length Indicator) fields. The receiver needs to process the extension part sequentially until E field specifies that no more E & LI fields will follow, and the receiver can determine where the data field part begins in the PDU. Furthermore, the receiver needs to read the RF (Re-segmentation Flag) before the receiver knows the size of the fixed part of the header (i.e., whether this is a RLC PDU or a RLC PDU segment).

In LTE, the requirement to sequentially process the whole header may not be an issue since data rates of up to 100 Mbps are considered and the number of SDUs expected to be carried inside one RLC PDU may be manageable. In 5G, the requirement to sequentially process the whole header may become problematic given the much higher data rates considered.

One proposed mechanism to enable parallel processing of the header and the data field inside RLC layer is to include a field in the RLC PDU header that specifies the amount of SDUs (data field elements (DFE)) carried in the PDU. Such a field may enable the receiver to determine immediately where the data field part starts in the PDU since the receiver immediately knows how many LI fields will follow the header. By knowing the LI field size in advance, the receiver knows where the data field part begins. This way the receiver may process the extension header as well as the data field part in parallel.

Another problem which may arise from the LTE RLC PDU structure is the use of PDU segments. The Rx RLC entity needs to interpret the RF field before it knows the header fixed part structure. Given that the size of a transport block (TB) changes dynamically depending on the scheduler decisions (e.g., multi-user scheduling, frequency domain scheduling of physical resources), channel conditions (Adaptive Modulation and Coding) etc., and the TB size may change between different ARQ transmission instances, the RLC may re-segment an earlier PDU to fit the given resources. This problem is a result of allocating sequence numbers to the RLC PDUs to enable arbitrary segmentation for PDUs requiring re-transmission to be enabled.

An alternative, where sequence numbers are allocated to SDUs at RLC layer, may enable re-transmissions to be considered on SDU basis. Thus, once each assembled PDU has been transmitted/submitted to lower layers, the assembled PDU could be forgotten or 'trashed' and each re-transmission may be considered as a 'new transmission', regardless of whether SDU/SDU segment is to be transmitted for the first time or not. The fixed part of the RLC PDU header may be kept unchanged regardless of whether the SDUs transmitted are re-transmissions or new transmissions which may improve predictability for the Rx RLC entity, and thus processing optimization.

The use of RLC SDU SN instead of RLC PDU SN may introduce overhead, since SDU SN will be incremented more quickly than RLC PDU SN when SDUs are concatenated. Given that there is only a need for the first SDU SN in the PDU header and the increased data rates in 5G, the increased overhead is negligible (in the order of a few bits) and can be justified with the improved processing efficiency.

A problem with SDU based sequence numbering may arise when SDU segmentation is considered for the RLC to optimize use of the resources granted by the lower layers. As the SN allocated for the PDU may be same for consecutive PDUs if the SDU needs to be segmented many times, additional fields in the header may be required to enable Rx entity to re-assemble the segmented SDU.

An LTE based segmentation scheme may be efficient from an overhead point of view, requiring in normal case only FI (Framing Info) field in the PDU header. The FI field is interpreted in the Rx RLC entity as shown in Table 1.

TABLE 1

FI field interpretation in LTE.

| Value | Description |
|---|---|
| 00 | First byte of the Data field corresponds to the first byte of a RLC SDU. Last byte of the Data field corresponds to the last byte of a RLC SDU. |
| 01 | First byte of the Data field corresponds to the first byte of a RLC SDU. Last byte of the Data field does not correspond to the last byte of a RLC SDU. |

TABLE 1-continued

FI field interpretation in LTE.

| Value | Description |
|---|---|
| 10 | First byte of the Data field does not correspond to the first byte of a RLC SDU. Last byte of the Data field corresponds to the last byte of a RLC SDU. |
| 11 | First byte of the Data field does not correspond to the first byte of a RLC SDU. Last byte of the Data field does not correspond to the last byte of a RLC SDU. |

As the PDU SN is maintained, the LTE RLC does not need any more information regarding the segmentation in addition to Length Indicators to re-assemble the segmented SDU in the receiver.

However, as discussed, when RLC re-transmission takes place, the RLC may re-segment the re-transmitted PDU, requiring an AMD PDU segment to be transmitted. This requires a Segment Offset (SO) field to be implemented in the header to indicate which part of the original AMD PDU the AMD PDU segment is from. The last segment flag (LSF) is also included to enable the receiver to determine when the AMD PDU is completely received (the FI field may not be used since it indicates the segmentation in the original PDU). Thus, the LTE RLC PDU structure requires interpretation of many fields from the PDU header in the processing chain before the Rx is able to process the PDU.

The usage of RLC SDU sequence numbering scheme has been proposed, with usage of an offset (OFFSET) and length (LEN) to indicate the position and length of the RLC segment in the original RLC SDU in byte resolution. This solution works for RLC SDU SN scheme. However, the scheme may be optimised in terms of PDU processing efficiency and overhead. Segment sequence number may be assigned for each transmitted segment. However, this method may be problematic if SDU segment needs to be further re-segmented since it may be challenging to conduct the segmentation arbitrarily unless one sequence number counts for one byte (essentially equal to the offset scheme above).

Figure 5:
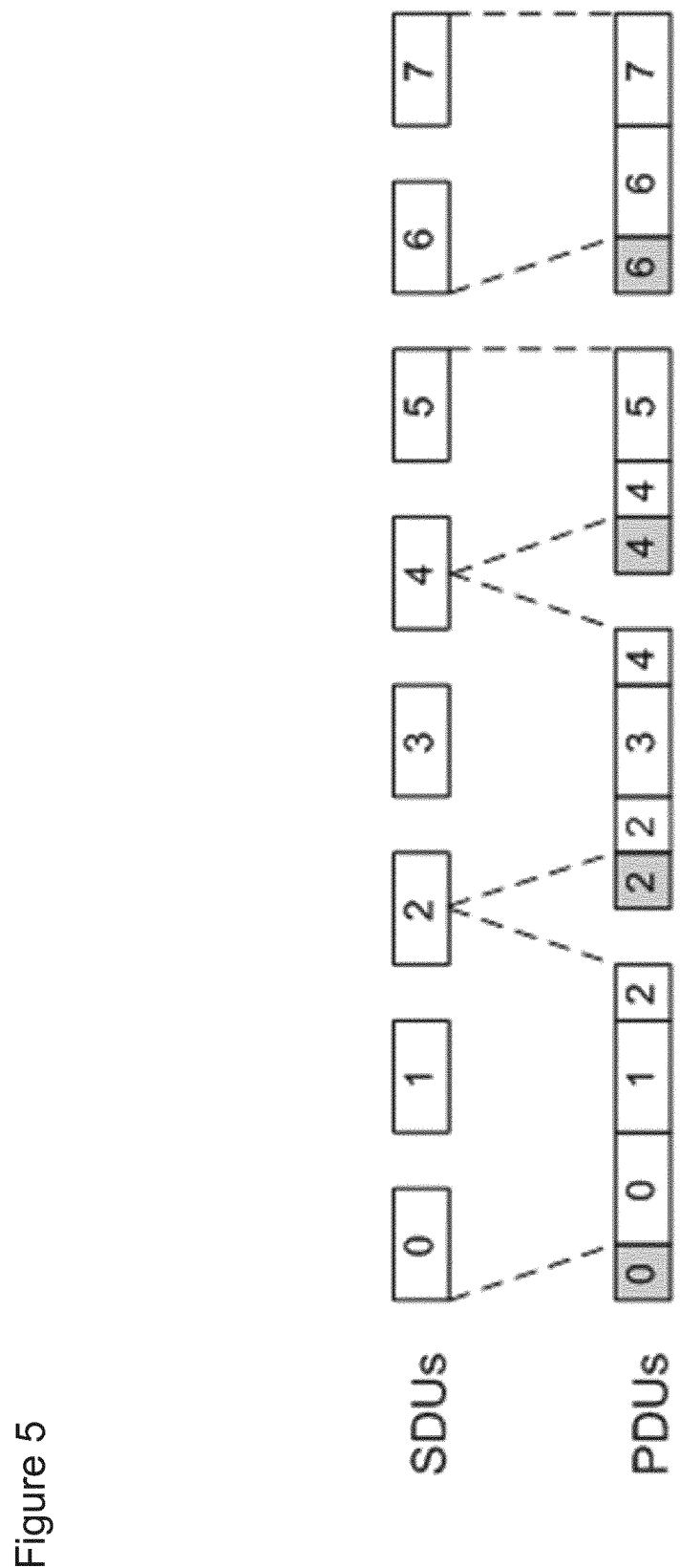
FIG. 5 shows a schematic diagram of SDU allocation to PDU and SN allocation for PDU header.

FIG. 5 shows an illustration of SDU allocation to PDU and SN allocation for the PDU header. For example SDU 0, 1 and first SDU 2 segment are allocated to a first PDU, which is allocated SN #0. Second SDU 2 segment, SDU 3 and first SDU 4 segment are allocated to a second PDU, which is allocated SN #2. Second SDU 4 segment and SDU 5 are allocated to a third PDU, with SN #4. SDU 6 and 7 are allocated to a fourth PDU allocated SN #6.

Figure 6:
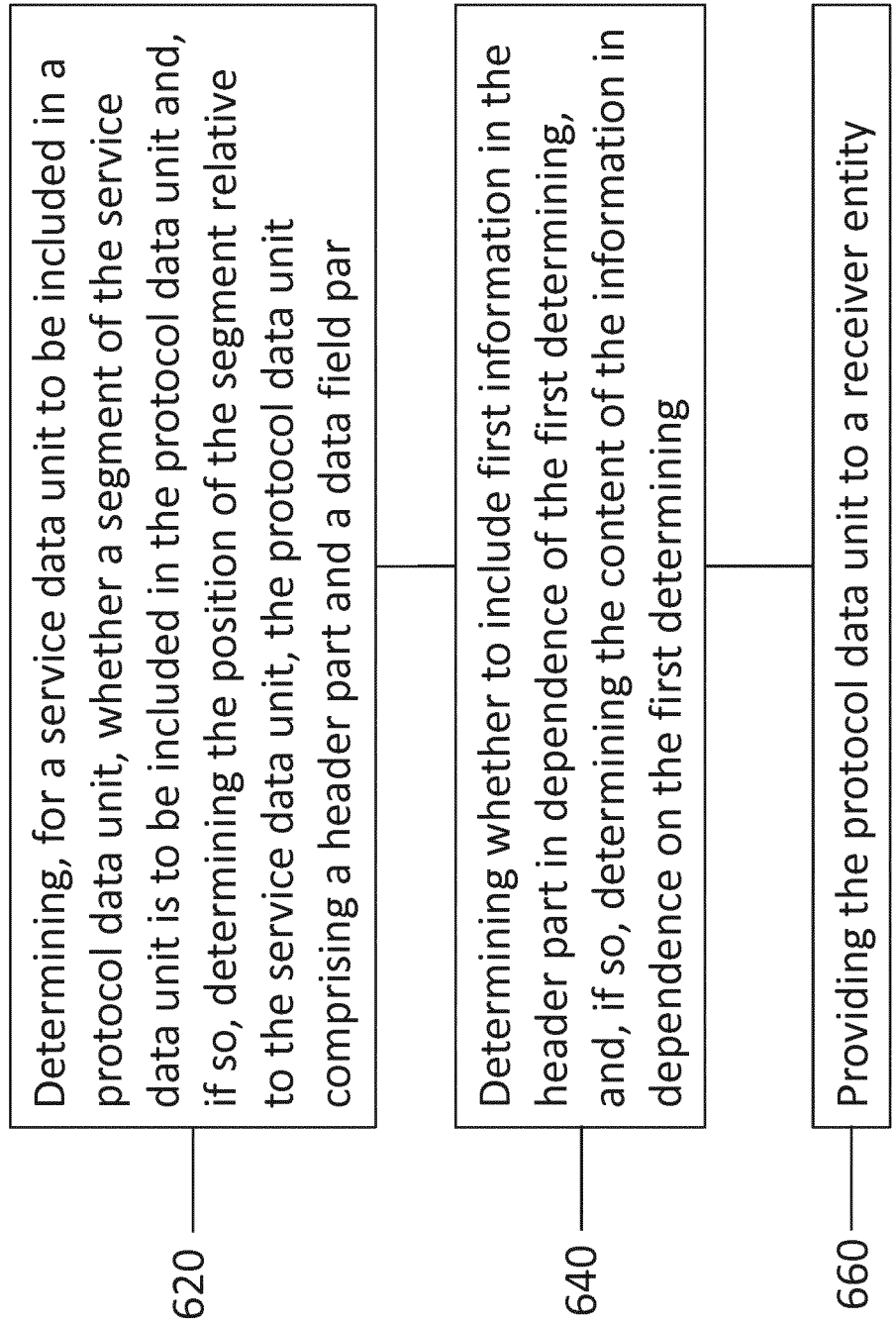
FIG. 6 shows a flowchart of an example method of segment handling.

FIG. 6 shows a flowchart of an example method of SDU segment handling for RLC layer in 5G or LTE base system where SDU base sequence numbering is used. The method may be performed at a transmission entity. The method comprises, in a first step 620, determining, for a service data unit to be included in a protocol data unit, whether a segment of the service data unit is to be included in the protocol data unit and, if so, determining the position of the segment relative to the service data unit, the protocol data unit comprising a header part and a data field part.

In a second step 640, the method comprises determining whether to include first information in the header part in dependence of the first determining, and, if so, determining the content of the information in dependence on the first determining.

In a third step 660, the method comprises providing the protocol data unit to a receiver entity.

Figure 7:
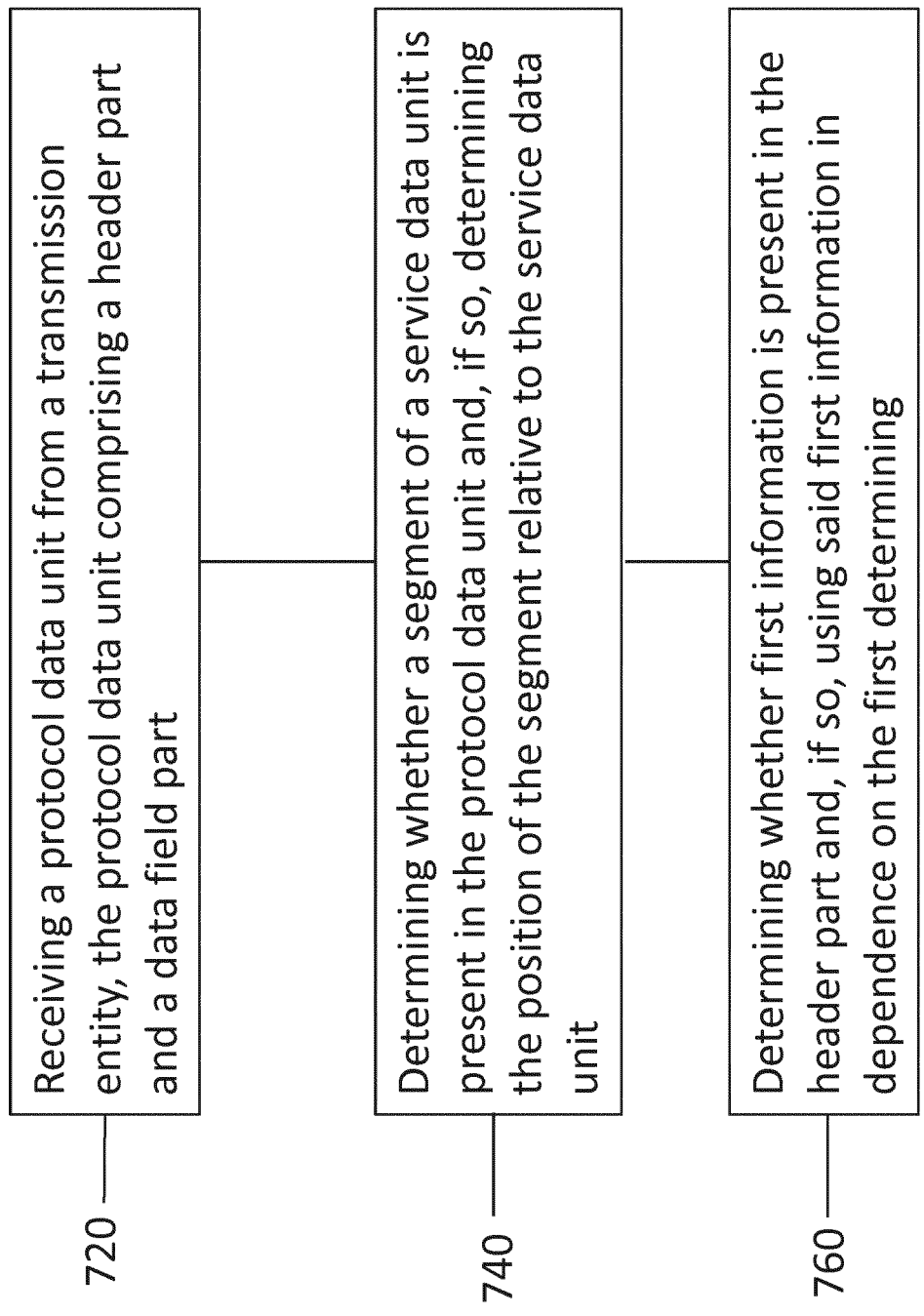
FIG. 7 shows a flowchart of an example method of segment handling.

FIG. 7 shows a method of SDU segment handling for RLC layer in 5G or LTE based system where SDU base sequence numbering is used. The method may be performed at a receiver entity. In a first step 720, the method comprises receiving a protocol data unit from a transmission entity, the protocol data unit comprising a header part and a data field part.

In a second step 740 the method comprises determining whether a segment of a service data unit is present in the protocol data unit and, if so, determining the position of the segment relative to the service data unit.

In a third step 760, the method comprises determining whether first information is present in the header part and, if so, using said first information in dependence on the first determining.

The transmission entity may comprise a Tx RLC entity. The receiver entity may comprise a Rx RLC entity. The method may be applicable to both AM and UM (unacknowledgement) mode RLC entities.

The method involves SDU segment's LI (Length Indicator) field reinterpretation at RLC layer depending on the segment position in the PDU and the PDU structure. The first information may comprise a length indicator (LI) field. The method is applicable using the configured LI field size as it can accommodate the whole SDU size.

The content of the first information may indicate the SDU length, SO (i.e., segment offset to the position of the SDU segment in bytes within the original SDU), normal length indicator. Alternatively, the first information may be omitted.

The method may avoid the requirement for additional fields in the RLC PDU header and provide a more efficient and simpler receiver operation, with only field interpretation changes depending on the scenario.

Determining the position of the SDU segment relative to the SDU may comprise determining whether the SDU segment is the first segment of a SDU, the last segment of an SDU and, if so, whether more data fits to the PDU size after the SDU.

Figure 8:
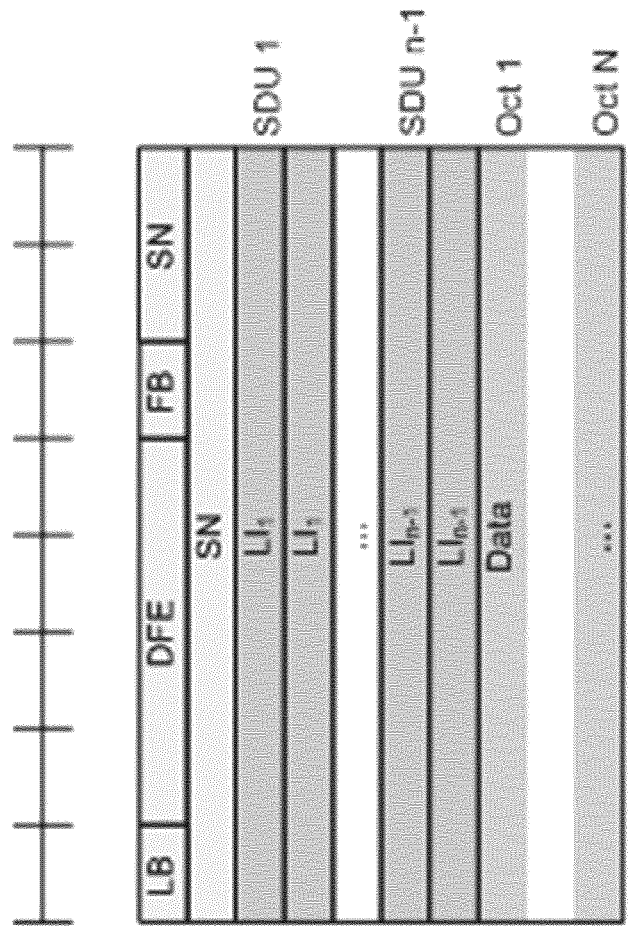
FIG. 8 shows a schematic diagram of an RLC PDU header including LB and DFE fields.

The above method may be applicable to, and take advantage of, a situation in which SDU segment can only be located either in the beginning or in the end of the assembled PDU, a given PDU cannot contain multiple SDU segments of the same SDU, at the Rx RLC entity, the complete PDU size is known by lower layer means, e.g., by MAC indication of the PDU size (this enables the Rx RLC to know the length of the last SDU in a PDU without Tx RLC indicating it in a separate LI), an RLC header includes Framing Information bits as discussed with reference to table 1, Tx RLC entity includes in the PDU header the SN of the first SDU or SDU segment in the PDU, the SDUs are in sequential order in the PDU and the PDU header includes a field that specifies the number of data field elements in the PDU (e.g. DFE shown in FIG. 8).

FIG. 8 shows an example PDU structure with a header part and a data field part. The header comprises framing information FI in the form of first byte (FB) and last byte (LB) fields, a DFE field and sequence number (SN) fields. The DFE field value corresponds to the number of SDUs in the PDU. The number of SDUs corresponds to the number of complete SDUs and/or SDU segments in the PDU. The value of the sequence number field corresponds to the first SDU SN of the PDU, for example as illustrated in FIG. 5. The first SDU SN may be an SDU segment SN. Possible framing information values are as shown in Table 1. The PDU includes LI fields for each SDU in the PDU ($LI_1$ to $LI_{n-1}$).

A method such as that described with reference to FIGS. 6 and 7 may provide efficient SDU segment handling for RLC layer in 5G or LTE based systems where SDU based sequence numbering is used. The method may provide a mechanism to handle SDU segmentation in the above defined RLC PDU structure with optimized processing and minimized overhead.

In an example embodiment, Tx RLC entity may fill up the PDU size (indicated by the lower layers, e.g., MAC) and may need to segment the SDU to fit in the remaining part of the PDU. When this is the first segment of that SDU, Tx RLC entity may allocate an LI field for this SDU segment in the RLC PDU header and indicate the whole SDU size in the LI field. That is, the Tx RLC entity determines that a segment of the service data unit is the first segment of the service data unit and the content of the first information comprises SDU length.

This proposal takes advantage of the assumption that at the Rx RLC entity, the complete PDU size is known by lower layer means, e.g., by MAC indication of the PDU size such that the Rx RLC can determine the length of the SDU segment by lower layer means.

In an embodiment, the Tx RLC entity fills up the PDU size and may need to segment the SDU to fit to the remaining part of the PDU. When this is not the first or the last segment of that SDU, the Tx RLC entity may indicate the Segment Offset to the position of the SDU segment in bytes within the original SDU in the LI field of this SDU segment. That is the Tx RLC entity determines that a segment of the service data unit is a segment between the first segment and the last segment, i.e., not the first or the last segment, of a service data unit and the content of the information indicates segment offset.

This proposal essentially means the PDU includes only the SDU segment based on the assumption that an SDU segment can only be located either in the beginning or in the end of the assembled PDU and the PDU header includes a field that specifies the number of data field elements in the PDU. The Rx RLC can determine the length of the SDU segment by lower layer means.

In an embodiment where the Tx RLC entity fills up the PDU size and the remaining SDU segment fits in the beginning of the PDU, Tx RLC entity may indicate the SDU segment length normally in the LI field. That is, the Tx RLC entity determines that a segment of the SDU is the last segment of the SDU and the content of the information indicates the SDU segment length. In case no more data fits to the PDU size than the complete last SDU segment, Tx RLC entity may omit the LI field. That is, if the Tx RLC entity determines that the segment of the SDU is the last segment of the SDU and fills the PDU, the Tx RLC entity determines not to include the first information in the header part.

A receiver entity may determine the position of the segment relative to the SDU in dependence on framing information and DFE information. When the receiver decodes the LB field and DFE field, it immediately knows how long the LI fields part is after the PDU fixed header part and where the data field begins in the PDU. This may enable rapid parallel processing in the Rx entity.

For example, when the Rx RLC entity decodes the received PDU header and FI field indicates that the last byte of the data field does not correspond to the last byte of a SDU, the Rx RLC entity may assume the LI field is present for the last data field element in the PDU.

If DFE>1, the Rx RLC entity may assume this is the first segment of this SDU and interpret the LI field as length of the whole SDU. That is the Rx RLC entity determines that the segment of the SDU is a first segment of the SDU and the content of the information indicates SDU length.

Otherwise, the Rx RLC entity interprets the LI field as Segment Offset to the position of the SDU segment in bytes within the original SDU. That is, the Rx RLC entity determines that the segment is not the last segment of an SDU, and the content of the information indicates segment offset.

The Rx RLC entity is able to determine whether or not SDU segment is the first or not based on the one FI latter bit (information of the last byte of the data field) and DFE field and it can determine the header length immediately after interpreting these fields.

When the Rx RLC entity decodes the received PDU header and FI field indicates that the last byte of the data field corresponds to the last byte of a SDU, the Rx RLC entity assumes the LI field is not present for the last data field element in the PDU.

If FI field indicates that the first byte of the data field does not correspond to the first byte of a SDU and either the last byte of the data field corresponds to the last byte of a SDU and DFE=1 or DFE>1, the Rx RLC entity assumes that this is the last segment of this SDU. If so, the Rx RLC entity reads SDU segment length from the corresponding LI field. That is, when the Rx RLC entity determines that the segment is the last segment of an SDU, the content of the information indicates SDU segment length. Otherwise, the Rx RLC entity calculates SDU segment length based on lower layer information of the complete PDU size.

The Rx RLC entity is able to determine the header length immediately after interpreting the FI field latter bit (information of the last byte of the data field) and DFE field. By interpreting the FI field first bit (information of the first byte of the data field), Rx RLC entity is able to determine whether this is a last segment of a SDU.

When the header part comprises DFE information, e.g. DFE field, the DFE field may be provided after the second bit of the framing information (LB) and before the first bit (FB) of the framing information as illustrated in FIG. 8. The DFE field may be placed such that it can be processed before the FB field. This placement of the DFE field may enable a receiver to determine the data field start position in the PDU as soon as possible in the processing, i.e., FB field does not affect to the header size. In FIG. 8, an exemplary illustration of proposed PDU structure is given when assuming the bits would be processed sequentially. It may also be that the processing is agreed to happen on a per byte/word basis and that can be taken into account during the system specification.

Based on the above example procedure for Rx and Tx RLC entities, it is also proposed that for the Framing Info field the bits are arranged in the RLC header such that the bit corresponding to the last byte of the PDU can be processed before the bit corresponding to the first byte of the PDU (named as LB and FB in FIG. 8. This is done since the last byte of the PDU (whether or not it corresponds to the last byte of a SDU) essentially determines the header part size of the PDU in the Rx RLC entity (i.e., whether or not LI field is present for the last data field element). The method does not require interpretation of FI field's first bit (information of the first byte of the data field) before being able to determine the header size and the start of the data field part.

It should be noted that the proposed mechanism works also with the LTE based LI scheme, however, to exploit the most efficient processing the scheme provides when applied together with the DFE solution.

Figure 9:
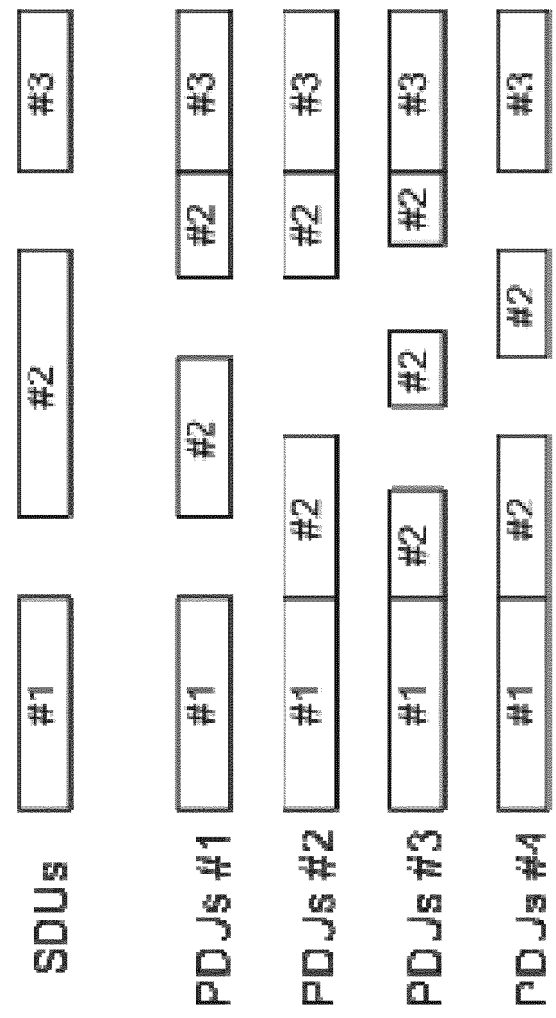
FIG. 9 shows a schematic diagram of four segmentation scenarios that may happen during PDU assembly.

FIG. 9 illustrates various segmentation scenarios that may happen during PDU assembly. In the first example scenario (labelled PDUs #1) the SDU #2 is segmented such that the first segment corresponds to complete PDU size and the second segment is the last segment and carried in a PDU with SDU #3.

Figure 10:
FIG. 10 shows a schematic diagram of an example PDU structure.
Figure 10:
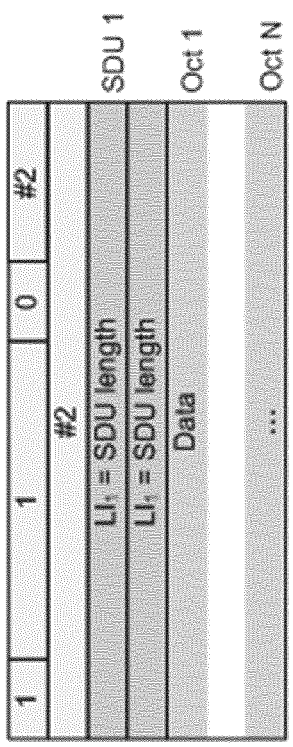

In FIG. 10 the PDU structure for the first segment of SDU #2 is presented. In FIG. 10, LB field is 1, since the last byte of the data field does not correspond to the last byte of an SDU and the FB field is 0 since the first byte of the data field corresponds to the first byte of an SDU. The SN corresponds to the first SDU segment SN, #2. The DFE field is 1, since one SDU (SDU segment SN #2) is present. In this example scenario, the segment is the first segment of the SDU and so the first information (LI field) indicates SDU length.

Figure 11:
FIG. 11 shows a schematic diagram of an example PDU structure.
Figure 11:
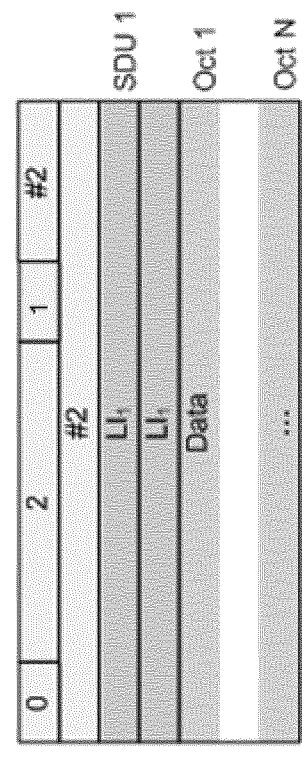

The PDU structure for the last segment of SDU #2, carried in a PDU with SDU #3 is presented in FIG. 11. Since the last byte of the data field corresponds to the last byte of an SDU, LB=0. Since the first byte of the data field does not correspond to the first byte of an SDU, FB=1. The SN corresponds to the first SDU segment SN, #2. The DFE field is 2 since two SDUs (one SDU segment, SDU segment SN #2, and one complete SDU, SDU SN #3) are present. In this example scenario, the segment is the last segment of the SDU and so the first information (LI field) indicates SDU segment length. Since the SDU SN #3 fits the remaining resources of the PDU, it can be considered to act as a last segment even though it is a complete SDU. Since SDU SN #3 is the last SDU, and fills the PDU, the LI field, or first information, can be omitted.

In a second example scenario (labelled PDUs #2) the SDU #2 first segment is carried in a PDU with SDU #1 and the last segment is similar to first scenario.

Figure 12:
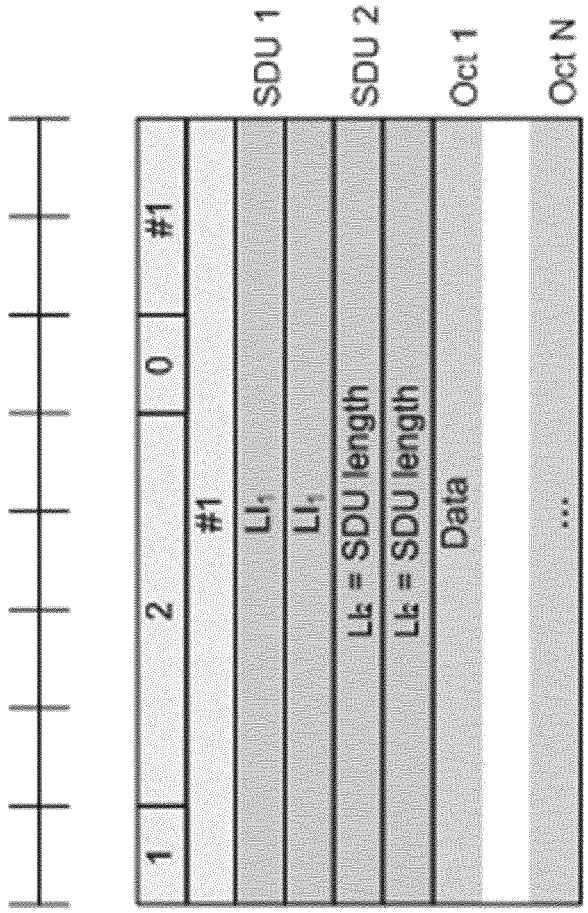
FIG. 12 shows a schematic diagram of an example PDU structure.

In FIG. 12 the PDU structure for the first segment of SDU #2 is presented; the PDU structure for the last segment is that presented in FIG. 11. In FIG. 12, LB=1 and FB=0 since the last byte of the data field does not correspond to the last byte of an SDU and the first byte of the data field corresponds to the first byte of an SDU. DFE=2 since two SDUs are carried in the PDU (one complete SDU, SDU SN #1 and one SDU segment, SDU segment SN #2) and the SN corresponds to the first SDU SN, #1. In this scenario the segment (SDU #2 segment) is the first segment and so the first information (LI$_2$ field) indicates SDU length.

In a third example scenario (labelled PDUs #3) the SDU #2 middle segment corresponds to complete PDU and first and last segments of SDU #2 are similar to second and first scenarios, respectively.

Figure 13:
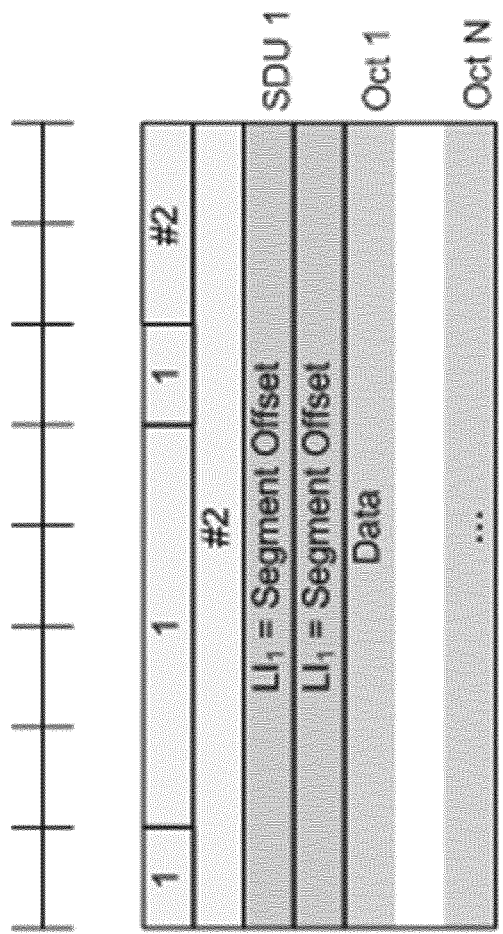
FIG. 13 shows a schematic diagram of an example PDU structure.

In FIG. 13 the PDU structure for the middle segment of SDU #2 is presented; the PDU structure for the first and last segments of SDU #2 is presented in FIGS. 12 and 11, respectively. In FIG. 13, LB=1 and FB=1 since the last byte of the data field does not correspond to the last byte of an SDU and the first byte of the data field does not correspond to the first byte of an SDU. DFE=1 since one SDU is carried in the PDU (SDU segment SN #2) and the SN corresponds to the first SDU segment SN of the PDU, #2. In the example scenario illustrated in FIG. 13, the segment is between the first segment and the last segment, that is, not the first segment or the last segment, and so the first information (LI field) comprises a segment offset.

In a fourth example scenario (labelled PDUs #4) the SDU #2 last segment corresponds to complete PDU size and the first segment of SDU #2 is similar to second scenario.

Figure 14:
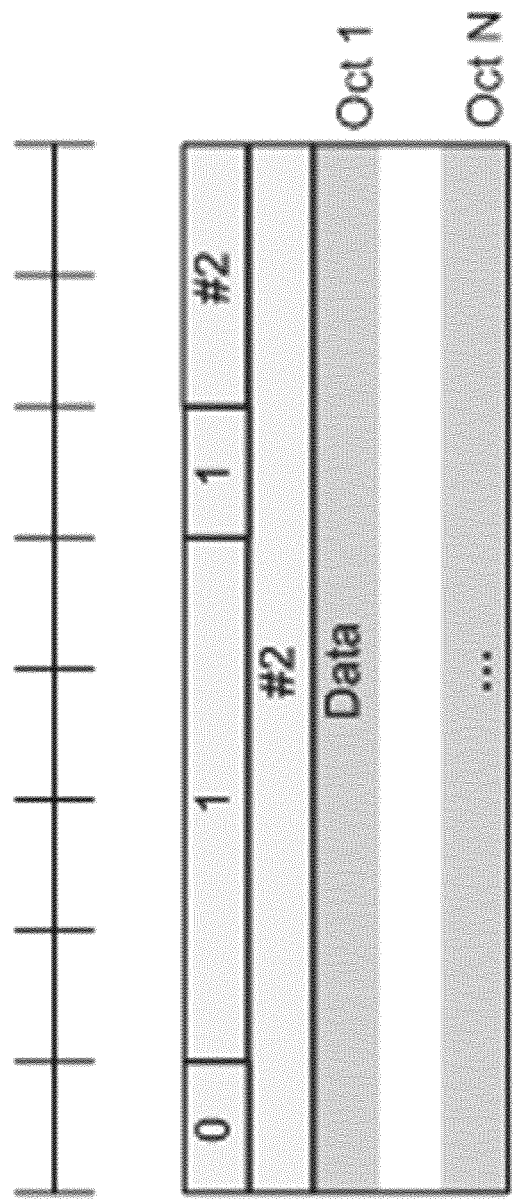
FIG. 14 shows a schematic diagram of an example PDU structure.

In FIG. 14 the PDU structure for the last segment of SDU #2 is presented; the PDU structure for the first segment of SDU #2 is similar to that presented in FIG. 12 above. In FIG. 14, LB=0 and FB=1 since the last byte of the data field corresponds to the last byte of an SDU and the first byte of the data field does not correspond to the first byte of an SDU. DFE=1 since one SDU is carried in the PDU (SDU segment SN #2) and the SN corresponds to the first SDU segment SN of the PDU, #2. In the example illustrated in FIG. 14, the SDU segment is the last segment of the SDU and fills the PDU. The first information is thus omitted.

A method such as that described with reference to the Figures may overcome the LTE RLC PDU re-segmentation operation with a simpler design. There is no need for a re-segmentation flag in the RLC PDU header as in LTE which alleviates receiver operation. There is no need for Last Segment Flag as the complete SDU length is known from the first segment's LI field as well as the FB and LB fields can be used also for re-segmentation cases.

The PDU structure does not change even if an SDU is re-segmented (which may be done arbitrarily), i.e., the same PDU header works for all cases. Receiver operation can be optimized as the whole PDU structure is known always.

The method does not require OFFSET value to be indicated for the first and last segments which serve the absolute most of the segments as usually SDU can fit to two consecutive PDUs. This may provide an overhead reduction since there is no need for offset and length fields at the same time. There is no need for additional fields defined in the header (i.e., OFFSET) as the Length needs to be indicated in many cases at the same time.

It should be understood that each block of the flowchart of FIGS. 6 and 7 and any combination thereof may be implemented by various means or their combinations, such as hardware, software, firmware, one or more processors and/or circuitry.

Figure 15:
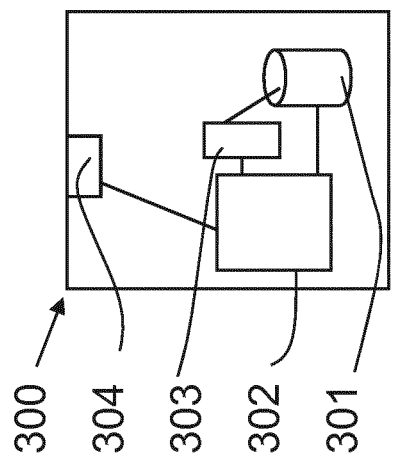
FIG. 15 shows a schematic diagram of an example control apparatus.

The method may be implemented in entities on a mobile device as described with respect to FIG. 2 or control apparatus as shown in FIG. 15. FIG. 15 shows an example of a control apparatus for a communication system, for example to be coupled to and/or for controlling a station of an access system, such as a RAN node, e.g. a base station, (e) node B or 5G AP, or a node of a core network such as an MME or S-GW, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control functions may comprise determining, for a service data unit to be included in a protocol data unit, whether a segment of the service data unit is to be included in the protocol data unit and, if so, determining the position of the segment relative to the service data unit, the protocol data unit comprising a header part and a data field part, determining whether to include information in the header part in dependence of the first determining, and, if so, determining the content of the information in dependence on the first determining and providing the protocol data unit to a receiver entity.

Alternatively, or in addition, control functions may comprise receiving a protocol data unit from a transmission entity, the protocol data unit comprising a header part and a data field part, determining whether a segment of a service data unit is present in the protocol data unit and, if so, determining the position of the segment relative to the service data unit, determining whether information is present in the header part and, if so, using said information in dependence on the first determining.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 5G similar principles can be applied in relation to other networks and communication systems, for example, LTE/LTE-A networks. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising
determining, for a protocol data unit (PDU) to be provided to a receiver entity, whether a segment of a service data unit (SDU) is to be included in the PDU and, if so, determining a position of the segment relative to the SDU, the PDU comprising a header part and a data field part;
determining whether to include information in the header part in dependence on the determining whether the segment of the SDU is to be included in the PDU, and, if so, determining the content of the information in the header part in dependence on the position of the segment relative to the SDU; and
providing the PDU to the receiver entity.

2. A method according to claim 1, comprising determining that a segment of the SDU is the first segment of the SDU and that the content of the information indicates the SDU length.

3. A method according to claim 1, comprising determining that a segment of the SDU is a segment between the first segment and the last segment of the SDU and that the content of the information indicates segment offset.

4. A method according to claim 1, comprising determining that a segment of the SDU is the last segment of the SDU and that the content of the information indicates the SDU segment length.

5. A method according to claim 1, comprising determining that a segment of the SDU is the last segment of the SDU and fills the PDU, and determining not to include the information in the header part.

6. A method according to claim 1, wherein the information comprises a length indicator field.

7. A method according to claim 1, wherein the header part comprises framing information, the framing information comprising a first bit indicative of whether the first byte of the data field corresponds to the first byte of a SDU and a second bit indicative of whether the last byte of the data field corresponds to the last byte of a SDU.

8. A method according to claim 7, wherein the header part comprises data field element information, the data field element indicative of the number of data field elements in the data field and comprising providing data field element information after the second bit of the framing information and before the first bit of the framing information.

9. A method according to claim 1, wherein the receiver entity is a radio link control entity.

10. A method according to claim 1, wherein the header part comprises a sequence number and the sequence number corresponds to the sequence number of the first SDU included in the PDU.

11. A non-transitory computer-readable storage medium comprising instructions stored thereon that, when executed by at least one processor, are configured to cause a computing system to perform the method of claim 1.

12. The method of claim 1 wherein the determining the content of the information in the header part comprises:
determining, based on the position of the segment relative to the SDU, whether the header part includes a first field type and not a second field type with respect to the segment, or includes a second field type and not a first field type with respect to the segment.

13. The method of claim 1 wherein the determining a position of the segment relative to the SDU comprises performing at least one of the following:
determining that the segment of the SDU is a first segment of the SDU;
determining that the segment of the SDU is a last segment of the SDU;
determining that the segment of the SDU is in between a first segment of the SDU and a last segment of the SDU;
wherein the determining the content of the information in the header part comprises determining whether the header part includes either a first field type or a second field type but not both the first field type and the second field type, with respect to the segment, based on the position of the segment relative to the SDU, wherein the first field type and the second field type provide different types of information with respect to the segment.

14. The method of claim 1 wherein:
the content of the information in the header part with respect to the segment includes a length of the segment, and does not include a segment offset for the segment, if the position of the segment relative to the SDU is at least one of a first segment of the SDU or a last segment of the SDU; and
the content of the information in the header part with respect to the segment comprises a segment offset for the segment, and does not include a length of the segment, if the position of the segment relative to the SDU is at least one position between the first segment of the SDU and the last segment of the SDU.

15. A method comprising:
receiving a protocol data unit (PDU) from a transmission entity, the PDU comprising a header part and a data field part;
determining whether a segment of a service data unit (SDU) is present in the PDU and, if so, determining a position of the segment relative to the SDU; and
determining whether information is present in the header part and, if so, determining a content of the information in dependence on the position of the segment relative to the SDU.

16. A method according to claim 15, comprising determining that a segment of the SDU is the first segment of the SDU and wherein the content of the information indicates the SDU length.

17. A method according to claim 15, comprising determining that a segment of the SDU is a segment between the first segment and the last segment of the SDU and wherein the content of the information indicates segment offset.

18. A method according to claim 15, comprising determining that a segment of the SDU is the last segment of the SDU and wherein the content of the information indicates the SDU segment length.

19. A method according to claim 15, wherein the information comprises a length indicator field.

20. A method according to claim 15, wherein the header part comprises framing information, the framing information comprising a first bit indicative of whether the first byte of the data field part corresponds to the first byte of a SDU and a second bit indicative of whether the last byte of the data field corresponds to the last byte of a SDU.

21. An apparatus comprising:
at least one processor and at least one memory including a computer program code, the at least one memory and the computer program code configured to, with the at least one processor, cause the apparatus at least to:
determine, for a protocol data unit (PDU) to be provided to a receiver entity, whether a segment of a service data unit (SDU) is to be included in the PDU and, if so, determine a position of the segment relative to the SDU, the PDU comprising a header part and a data field part;
determine whether to include information in the header part in dependence on the determining whether the segment of the SDU is to be included in the PDU, and, if so, determine the content of the information in the header part in dependence on the position of the segment relative to the SDU; and
provide the PDU to the receiver entity.

22. An apparatus comprising:
at least one processor and at least one memory including a computer program code, the at least one memory and the computer program code configured to, with the at least one processor, cause the apparatus at least to:
receive a protocol data unit (PDU) from a transmission entity, the PDU comprising a header part and a data field part;
determine whether a segment of a service data unit (SDU) is present in the PDU and, if so, determine a position of the segment relative to the SDU; and
determine whether information is present in the header part and, if so, determine a content of the information in dependence on the position of the segment relative to the SDU.

* * * * *

(12) INTER PARTES REVIEW CERTIFICATE (3482nd)
United States Patent
Turtinen et al.

(10) Number: US 10,701,588 K1
(45) Certificate Issued: Mar. 8, 2024

(54) METHODS, APPARATUSES AND COMPUTER PROGRAM PRODUCT FOR PDU FORMATTING ACCORDING TO SDU SEGMENTATION

(71) Applicants: Samuli Heikki Turtinen; Timo Koskela

(72) Inventors: Samuli Heikki Turtinen; Timo Koskela

(73) Assignee: NOKIA SOLUTIONS AND NETWORKS OY

Trial Number:

IPR2022-00632 filed Mar. 9, 2022

Inter Partes Review Certificate for:

Patent No.: 10,701,588
Issued: Jun. 30, 2020
Appl. No.: 16/065,084
Filed: Jun. 21, 2018

The results of IPR2022-00632 are reflected in this inter partes review certificate under 35 U.S.C. 318(b).

INTER PARTES REVIEW CERTIFICATE
U.S. Patent 10,701,588 K1
Trial No. IPR2022-00632
Certificate Issued Mar. 8, 2024

AS A RESULT OF THE INTER PARTES REVIEW PROCEEDING, IT HAS BEEN DETERMINED THAT:

Claims 1, 3-7, 9, 11-13, 15 and 17-22 are cancelled.

* * * * *